US012184706B2

(12) United States Patent
Ramsey (10) Patent No.: US 12,184,706 B2
(45) Date of Patent: Dec. 31, 2024

(54) METHOD FOR RESOURCE SHARING IN VIDEO TELECONFERENCES

(71) Applicant: Salesforce, Inc., San Francisco, CA (US)

(72) Inventor: Miles J Ramsey, Portland, OR (US)

(73) Assignee: Salesforce, Inc., San Francisco, CA (US)

( * ) Notice: Subject to any disclaimer, the term of this patent is extended or adjusted under 35 U.S.C. 154(b) by 101 days.

(21) Appl. No.: 17/585,106

(22) Filed: Jan. 26, 2022

(65) Prior Publication Data
US 2023/0239332 A1    Jul. 27, 2023

(51) Int. Cl.
*H04L 65/1083* (2022.01)
*H04L 65/403* (2022.01)

(52) U.S. Cl.
CPC ........ *H04L 65/1083* (2013.01); *H04L 65/403* (2013.01)

(58) Field of Classification Search
CPC .......................... H04L 65/1083; H04L 65/403
See application file for complete search history.

(56) References Cited

U.S. PATENT DOCUMENTS

| | | | |
|---|---|---|---|
| 11,356,395 B1* | 6/2022 | Deleuze | H04L 51/18 |
| 2011/0282893 A1* | 11/2011 | Dolin | H04L 67/535 |
| | | | 707/769 |
| 2022/0321616 A1* | 10/2022 | Chopdekar | H04L 65/4015 |

* cited by examiner

*Primary Examiner* — Amal S Zenati
(74) *Attorney, Agent, or Firm* — Nicholson De Vos Webster & Elliott LLP (57) ABSTRACT

A method of resource sharing in a teleconference involves detecting a presentation of a first resource by a participant of the teleconference, determining a locator for the first resource, in response to the detecting of the first resource, generating a functioning link to the first resource based on the locator, and sending the functioning link to the first resource to another participant to be displayed in a user interface of the teleconference.

18 Claims, 5 Drawing Sheets

METHOD FOR RESOURCE SHARING IN VIDEO TELECONFERENCES

TECHNICAL FIELD

One or more implementations relate to the field of teleconference; and more specifically, to a method and system for sharing resources during a video teleconference.

BACKGROUND ART

Video teleconferences involve the exchange of video and audio between participants that are each using a client application or program to participate in the video teleconference. The video teleconference applications can be standalone applications or can be browser based applications. The video teleconferences enable the exchange of audio and video streams between the participants enabling each participant to see and hear the other participants. In some cases, the video teleconferences can be supported by video teleconference services that facilitate the creation and exchange of the video conferencing sessions. In other cases, the video conferencing sessions are entirely peer to peer communications between the participant client applications.

Video teleconference applications can also support additional functions and features to facilitate collaboration amongst the participants. One additional function that is often provided is a presentation mode. In the presentation mode, one of the participants can share a screen or window from their user device. This feature is often utilized to enable a presentation of a slide show or similar document. However, the sharing of the presentation of the slides or document is entirely a video and audio presentation. The other participants do not have access or a copy of the underlying slides or documents. To share such slides or documents, the presenter would typically email the slides or documents to the other participants as attachments that the other participants can download and access.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for resource sharing in a video teleconference session. During video teleconference sessions when one participant is presenting and visiting multiple webpages, or showing multiple documents, the other participants would also like to access those webpages at the same time to view or interact with the webpage in more depth. Similarly, a presented document can be shared automatically with the other participants or made available at a shared location. Presenters when displaying their screen in video teleconference can switch on resource sharing in the user interface of the video teleconference application. When resource sharing is enabled, then any website or document that the presenter visits or accesses can be shared with the other participants of the video teleconference session, allowing the other participants to click on it if they wish. The locator for the resource can be displayed in a chat window or in a separate side bar. In some implementations, it is possible to either only display the current resource locator that the presenter is on, or a running history of the resources throughout the meeting can be generated. Presenters can turn off link sharing to stop sharing resource locators with participants at any time.

Figure 1:
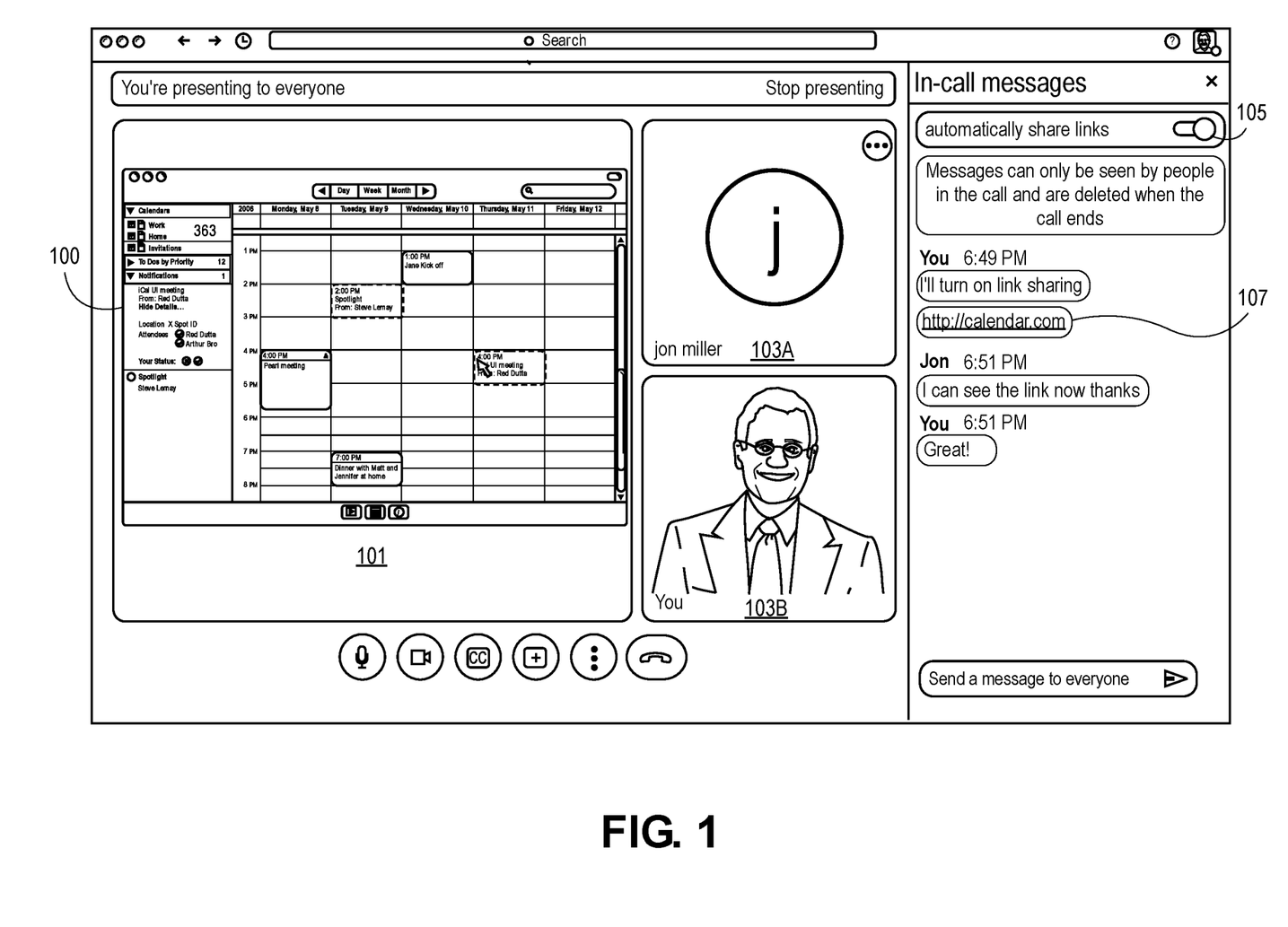
FIG. 1 is a diagram of one example of a video teleconference application interface, according to some implementations.

FIG. 1 is a diagram of one example of a video teleconference application interface, according to some implementations. The video teleconference application 100 in this example is part of a browser implementation. The video teleconference application includes a set of participants 103A, 103B. Any number of participants can be supported by the video teleconference service. The participants can each share their own audio and video streams that can be captured by their respective user devices and accessories (e.g., web cameras, headsets, microphones, and similar accessories).

Any one of the participants can initiate a presentation 101. In the illustrated example, the host presenter 103B shares his screen to show a webpage that provides a calendar service. The presenter 103B has also selected via a user interface element 105 to automatically share resource locators. The enablement of the resource sharing function whether as a function of a client application or a plug-in for a browser, monitors the presentation 101 to detect resources being shown and shares a locator for those resources. In this example, a uniform resource locator (URL) 107 is automatically displayed in a chat window for the other participants to utilize to access the same resource. In the illustrated example, the resource locator is an active URL formatted as a hypertext transmission protocol (HTTP) link to enable each participant to immediately activate the link.

In the example implementation, the resource locator is presented in a chat window in chronological order with the ongoing chat between participants. In other implementations, the resource locator can be placed in a separate interface window, such as a resource locator log, where a participant can similarly select a navigable link to open the shared resource. In some implementations, the resource sharing function can also be configured to prompt the presenting participant upon detecting each resource being presented to confirm the sharing of the resource and to confirm the accuracy of the locator (e.g., a URL).

Figure 2:
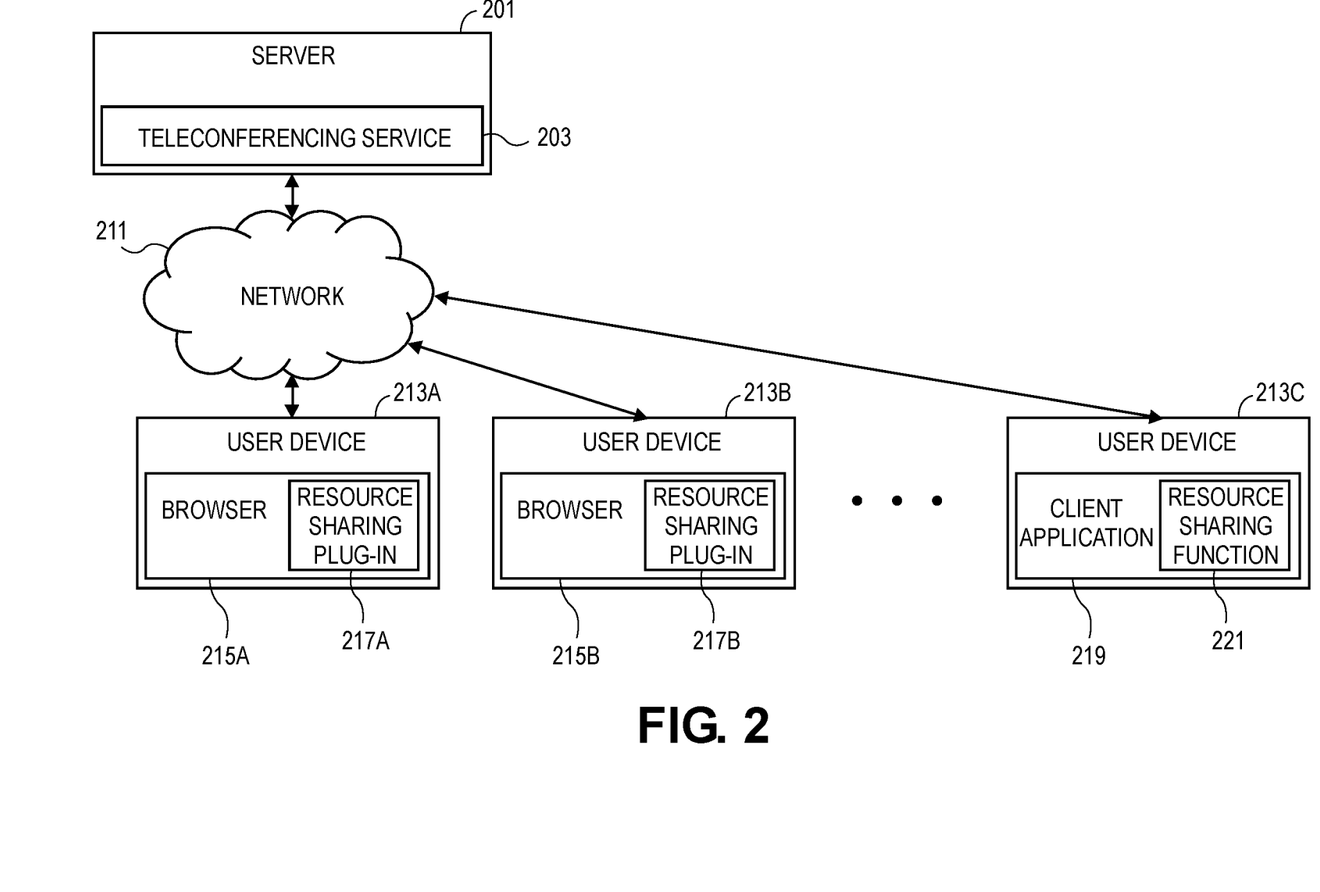
FIG. 2 is a diagram of one example of the architecture of a video teleconference services, according to some implementations.

FIG. 2 is a diagram of one example of the architecture of a video teleconference services, according to some implementations. In the illustrated example, a video teleconference system with hosted functions or support is shown. In a peer to peer implementation, the teleconference service 203 at a server 201 can be omitted. In the illustrated example implementation, a set of user devices 213A-C is participating in a teleconference session.

Each user device 213A-C executes either a browser 215A or 215B or a dedicated client application 219. A browser 215A or 215B implementation can utilize a plug-in 217A or 217B or similar set of code to provide the resource location sharing features described herein. In other cases, the resource sharing functions 221 can be discrete or embedded functions in a client application 219 that provides teleconference services. Each of these implementations is inter-compatible. The resource sharing plug-ins and functions can send resource locators to each of the participants in a teleconference session. In some implementations, the resource sharing plug-ins 217A or 217B and resource sharing functions 221 can communicate with one another via a side channel to share resource locators and manage a log of the resource locators for a teleconference session. In some implementations, the resource sharing plug-ins 217A or 217B and/or resource sharing functions 221 can upload copies of shared resources to a teleconference service 203 or similar location to facilitate the sharing of the resource during a teleconference session.

The user devices 213A-C can communicate with one another over a network 211. The network can be the Internet or other similar wide area network (WAN). In other cases, the network can be a local area network (LAN). Any combination of network types can be combined to form the network 211 to enable the exchange of the shared locators between the user devices 213A-C. For example, in some cases at least one of the user devices 213A-C is a mobile device such as a smartphone that is connected to a cellular telecommunications network. At least one of the other user devices 213A-C can be connected to a wired or wireless home or business network. The network 211 can in such cases encompass combination of the Internet Service Provider network and the cellular telecommunications network as well as any intermediate networks.

In implementations, where a teleconference service 203 is present, the teleconference service 203 can be hosted by a server 201 or a set of servers. A 'set,' as used herein can refer to any positive whole number of items including one item. The teleconference service 203 can facilitate the establishment of a teleconference session by exchanging session information between the participants. In some cases, the teleconference service 203 can manage or direct the handling of data packets for the teleconference session. In some implementations, the teleconference service 203 can host shared resources and provide a locator for accessing these shared resources during the teleconference session. The shared resource can be stored at a location managed by the teleconference service 203.

In other implementations, the teleconference service 203 can be hosted by a server in a cloud computing environment. The cloud computing environment can host any number of teleconference services 203 including scenarios where the teleconference services 203 are instances per teleconference session and distributed over the cloud computing environment.

Figure 3:
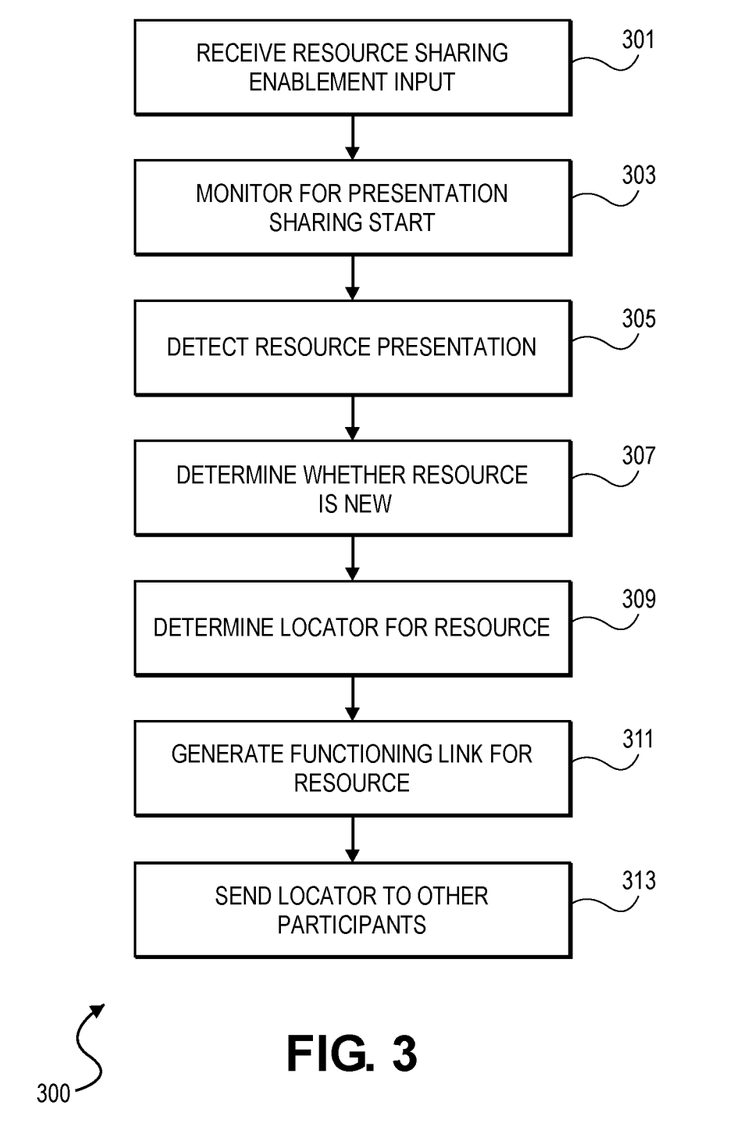
FIG. 3 is a flowchart of one example of the operation of the resource sharing function, according to some implementations.

FIG. 3 is a flowchart of one example of the operation of the resource sharing function, according to some implementations. In some implementations, the teleconference clients can trigger the shared resource functions or plug-ins, when a user toggles on the support for the resource sharing (Block 301). The shared resource functions and plug-ins when enabled monitor for a participant to initiate a presentation (Block 303). Presentations can be initiated by a participant selecting a user interface element of sharing a screen, window, or similar element. The initiation of a presentation can generate an event that is captured by the shared resource function or plug-in or modify a data structure that tracks the state of the teleconference session that can be detected by the shared resource function of plug-in. In other implementations, the shared resource function or plug-in can modify the coding of the presentation functions to generate a notification or similar detectable state change.

When the shared resource function or plug-in detects the initiation of a presentation, then the shared resource function or plug-in can monitor user input or navigation selections to identify a locator for each website or document that is presented (Block 305). The shared resource that is shared can be any one or more of a website, document, a slide show, an image, a video, or similar media. In some implementations, the shared resource function of plug-in can directly read an address in a browser, file navigator, or similar application to obtain an address or locator for the shared resource. In other implementations, the shared resource function or plug-in can 'scrape' the video stream of the presentation by doing image recognition, character recognition and similar techniques to identify an address, path, or similar locator (e.g., a URL, file name and path, or similar locator).

The shared resource function or plug-in can compare each detected shared resource locator with previously detected shared resource locators to ensure that each shared resource is unique (Block 307). The comparison of the shared resource locator can be a complete or partial match between a newly detected shared resource locator and a log of prior detected shared resource locators in the current teleconference session. A partial match can be utilized to identify a base or home website or document where navigation within the website or document can be part of the URL. These partial matches can be discarded in some implementations to prevent a spamming of shared resource locators to the participants. For example, if a prior shared resource locator was www.calendar.com/joe, then subsequent shared resource locators for www.calendar.com/joe/january and www.calendar.com/joe/february could be discarded due to the partial match of the base of the shared locator where additions to the 'base' shared locator are not considered new shared resources.

If the detected shared resource locator is identified as new, then the shared resource locator can be verified as accessible by requesting or accessing the shared resource. In some cases, where the shared resource is a document, the shared resource can be uploaded to the teleconference service and a shared resource locator can be generated (Block 309). Once the shared resource locator is determined it can be converted into a link or similar mechanism for access (Block 311). For example, a web page URL can be prefaced with an HTTP designator and shared locators can be similarly converted (e.g., into file transfer protocol (FTP) links or similar accessible links). The converted shared resource locator can then be sent to the other participants of the teleconference session (Block 313). The shared resource locator can be sent in an existing chat window using the communication links established for that chat window. In other implementations, the shared resource locator can be shared in a separate channel and displayed in a separate share resource log.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
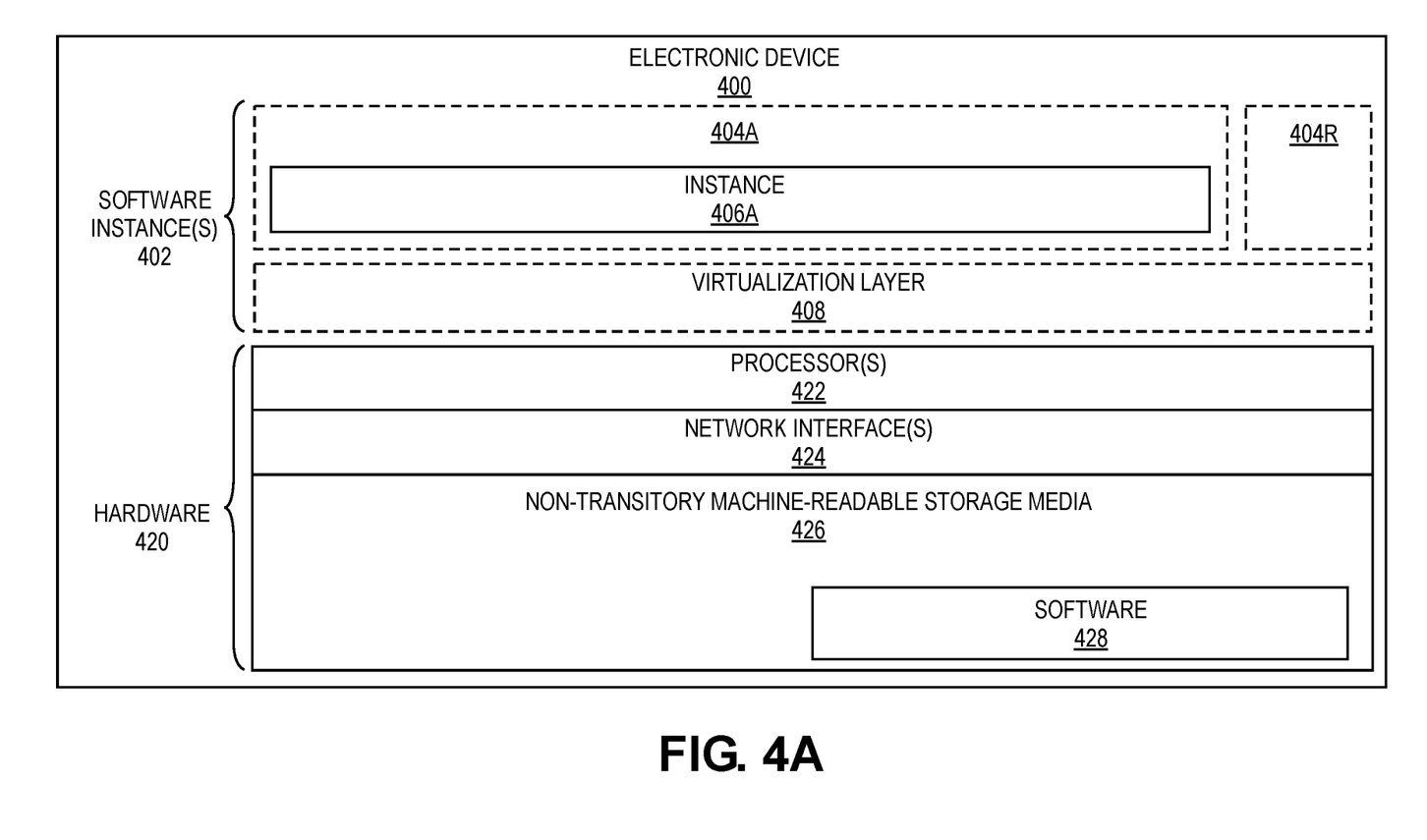
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the resource sharing service may be implemented in one or more electronic devices 400. In one implementation: 1) each of the clients is implemented in a separate one of the electronic devices 400 (e.g., in end user devices where the software 428 represents the software to implement clients to interface directly and/or indirectly with the resource sharing service (e.g., software 428 represents a web browser, a native client, a portal, a command-line interface, and/or an application programming interface (API) based upon protocols such as Simple Object Access Protocol (SOAP), Representational State Transfer (REST), etc.)); 2) the resource sharing service is implemented in a separate set of one or more of the electronic devices 400 (e.g., a set of one or more server devices where the software 428 represents the software to implement the resource sharing service); and 3) in operation, the electronic devices implementing the clients and the resource sharing service would be communicatively coupled (e.g., by a network) and would establish between them (or through one or more other layers and/or or other services) connections for submitting input to the resource sharing service and returning active resource links or locators to the clients. Other configurations of electronic devices may be used in other implementations (e.g., an implementation in which the client and the resource sharing service are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
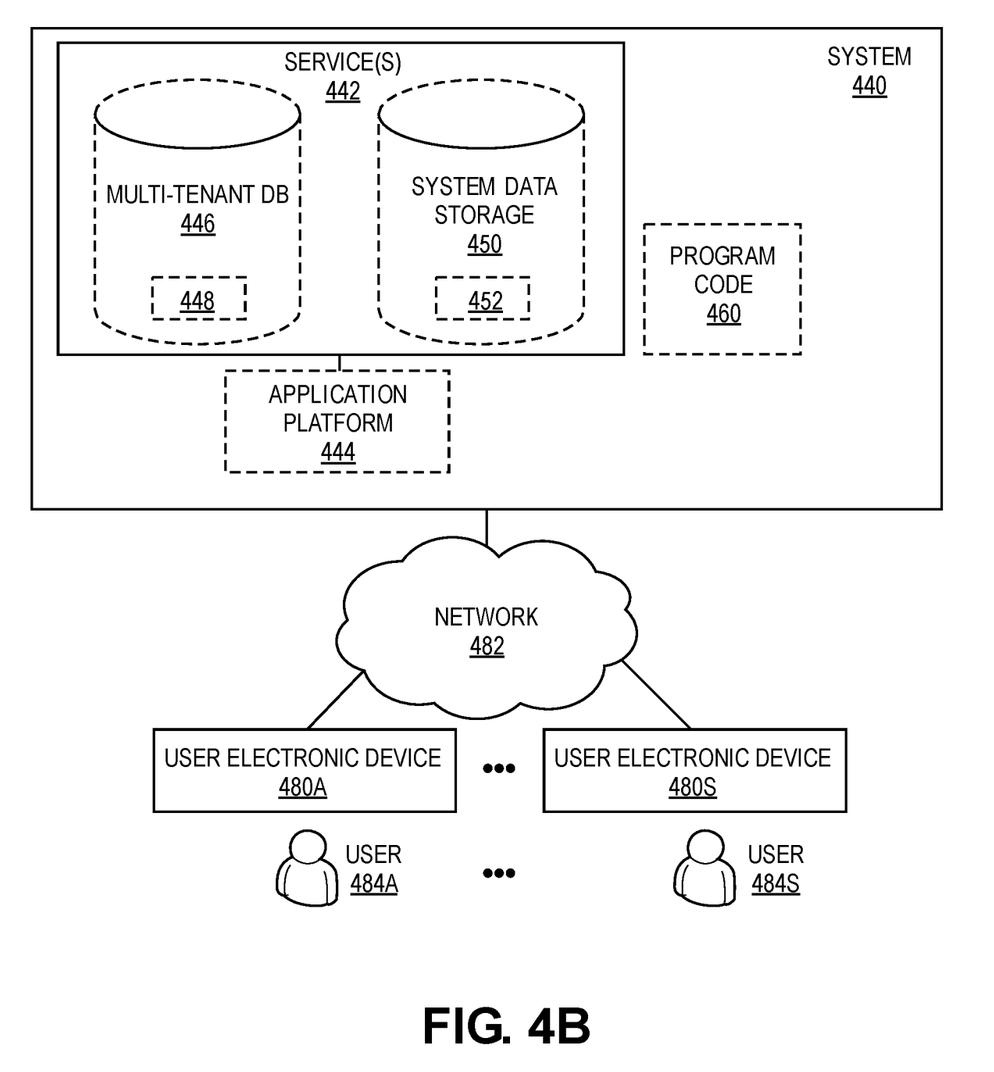
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the resource sharing service. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the resource sharing service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

Conclusion

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method of resource sharing in a teleconference, the method comprising:
   detecting initiation of a presentation by a participant of the teleconference;
   responsive to the detecting, monitoring user input of the participant to identify a locator for a first resource presented by the participant;
   comparing the locator for the first resource to a log of one or more locators that correspond to one or more respective resources that have been previously detected in the teleconference;
   responsive to determining that the locator for the first resource does not match any locator in the log of one or more locators:
   uploading the first resource to a network location accessible to browsers of other participants of the teleconference, each browser having a plugin installed thereon;
   converting the locator to a functioning link to the first resource at the network location; and
   sending one or more functioning links to the browsers of the other participants, wherein each browser, in combination with a respective plugin, is to use one of the one or more functioning links to access the first resource at the network location and to cause the corresponding content to be displayed in a user interface of the teleconference.

2. The method of claim 1, further comprising:
   detecting an enablement of resource sharing.

3. The method of claim 1, wherein the comparing the locator for the first resource to the log of one or more locators that correspond to one or more respective resources that have been previously detected in the teleconference is based on a partial match or a complete match.

4. The method of claim 1, further comprising:
   determining a uniform resource locator for the first resource at the network location.

5. The method of claim 4, wherein determining the uniform resource locator comprises:
   determining a base of the uniform resource locator to utilize as the locator for the first resource at the network location.

6. The method of claim 1, wherein the first resource is any one of a web page, a document, a slide show, an image, or a video.

7. A non-transitory machine-readable storage medium that provides instructions that, when executed by a set of one or more processors, are configurable to cause the set of one or more processors to perform operations for resource sharing in teleconferences comprising:
   detecting initiation of a presentation by a participant of the teleconference;
   responsive to the detecting, monitoring user input of the participant to identify a locator for a first resource presented by the participant;
   comparing the locator for the first resource to a log of one or more locators that correspond to one or more respective resources that have been previously detected in the teleconference;
   responsive to determining that the locator for the first resource does not match any locator in the log of one or more locators:
   uploading the first resource to a network location accessible to browsers of other participants of the teleconference, each browser having a plugin installed thereon;
   converting the locator to a functioning link to the first resource at the network location; and
   sending one or more functioning links to the browsers of the other participants, wherein each browser, in combination with a respective plugin, is to use one of the one or more functioning links to access the first resource at the network location and to cause the corresponding content to be displayed in a user interface of the teleconference.

8. The non-transitory machine-readable storage medium of claim 7, having further instructions stored therein that, when executed, cause the set of one or more processors to perform further operations comprising:
   detecting an enablement of resource sharing.

9. The non-transitory machine-readable storage medium of claim 7, wherein the comparing the locator for the first resource to the log of one or more locators that correspond to one or more respective resources that have been previously detected in the teleconference is based on a partial match or a complete match.

10. The non-transitory machine-readable storage medium of claim 7, the operations further comprising:
    determining a uniform resource locator for the first resource at the network location.

11. The non-transitory machine-readable storage medium of claim 10, wherein determining the uniform resource locator comprises:
   determining a base of the uniform resource locator to utilize as the locator for the first resource at the network location.

12. The non-transitory machine-readable storage medium of claim 7, wherein the first resource is any one of a web page, a document, a slide show, an image, or a video.

13. An apparatus comprising:
   a set of one or more processors; and
   a non-transitory machine-readable storage medium coupled to the set of one or more processors that provides instructions that, if executed by the set of one or more processors, are configurable to cause the apparatus to perform operations comprising,
   detecting initiation of a presentation by a participant of the teleconference;
   responsive to the detecting, monitoring user input of the participant to identify a locator for a first resource presented by the participant;
   comparing the locator for the first resource to a log of one or more locators that correspond to one or more respective resources that have been previously detected in the teleconference;
   responsive to determining that the locator for the first resource does not match any locator in the log of one or more locators:
   uploading the first resource to a network location accessible to browsers of other participants of the teleconference, each browser having a plugin installed thereon;
   converting the locator to a functioning link to the first resource at the network location; and
   sending one or more functioning links to the browsers of the other participants, wherein each browser, in combination with a respective plugin, is to use one of the one or more functioning links to access the first resource at the network location and to cause the corresponding content to be displayed in a user interface of the teleconference.

14. The apparatus of claim 13, the operations further comprising:
   detecting an enablement of resource sharing.

15. The apparatus of claim 13, wherein the comparing the locator for the first resource to the log of one or more locators that correspond to one or more respective resources that have been previously detected in the teleconference is based on a partial match or a complete match.

16. The apparatus of claim 13, the operations further comprising:
   determining a uniform resource locator for the first resource at the network location.

17. The apparatus of claim 16, wherein determining the uniform resource locator comprises:
   determining a base of the uniform resource locator to utilize as the locator for the first resource at the network location.

18. The apparatus of claim 13, wherein the first resource is any one of a web page, a document, a slide show, an image, or a video.

* * * * *